United States Patent
Friebe et al.

(10) Patent No.: US 10,412,359 B2
(45) Date of Patent: Sep. 10, 2019

(54) METHOD FOR GENERATING A VIRTUAL IMAGE OF VEHICLE SURROUNDINGS

(71) Applicant: Conti Temic Microelectronic GmbH, Nuremberg (DE)

(72) Inventors: Markus Friebe, Gefrees (DE); Rodrigo Garcia Marques, Bamberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 21 days.

(21) Appl. No.: 15/735,519

(22) PCT Filed: May 11, 2016

(86) PCT No.: PCT/DE2016/200220
§ 371 (c)(1),
(2) Date: Dec. 11, 2017

(87) PCT Pub. No.: WO2016/198059
PCT Pub. Date: Dec. 15, 2016

(65) Prior Publication Data
US 2018/0176533 A1 Jun. 21, 2018

(30) Foreign Application Priority Data
Jun. 11, 2015 (DE) .......................... 10 2015 210 738

(51) Int. Cl.
*H04N 13/00* (2018.01)
*H04N 13/111* (2018.01)
(Continued)

(52) U.S. Cl.
CPC ............ *H04N 13/111* (2018.05); *G06T 15/10* (2013.01); *G06T 15/205* (2013.01); *G09B 9/05* (2013.01);
(Continued)

(58) Field of Classification Search
None
See application file for complete search history.

(56) References Cited

U.S. PATENT DOCUMENTS

2004/0260469 A1 12/2004 Mizusawa
2004/0264763 A1* 12/2004 Mas ..................... G01C 23/00
382/154
(Continued)

FOREIGN PATENT DOCUMENTS

| DE | 102008036009 A1 | 10/2009 |
|---|---|---|
| DE | 102012203523 A1 | 9/2013 |
| DE | 112011105371 T5 | 3/2014 |
| DE | 102013220005 A1 | 4/2015 |
| JP | 2009171537 A | 7/2009 |

OTHER PUBLICATIONS

Nieuwenhuisen, Matthias, et al. "Multimodal obstacle detection and collision avoidance for micro aerial vehicles." 2013 European Conference on Mobile Robots. IEEE, 2013.*
(Continued)

*Primary Examiner* — Sultana M Zalalee

(57) ABSTRACT

The invention relates to a method for generating a virtual image of vehicle surroundings, in which real images of the vehicle surroundings are recorded by means of one or more cameras positioned on the vehicle and in order to generate the virtual image individual pixels from the real images captured by means of the cameras are projected onto projection points $(P_i)$ in a three-dimensional surroundings model of the vehicle surroundings.

9 Claims, 3 Drawing Sheets

(51) Int. Cl.
*G06T 15/10* (2011.01)
*G06T 15/20* (2011.01)
*G09B 9/05* (2006.01)
*H04N 7/18* (2006.01)

(52) U.S. Cl.
CPC ........ *H04N 7/181* (2013.01); *B60R 2300/105* (2013.01); *B60R 2300/303* (2013.01); *B60R 2300/607* (2013.01); *G06T 2207/30252* (2013.01); *G06T 2215/12* (2013.01)

(56) References Cited

U.S. PATENT DOCUMENTS

| | | |
|---|---|---|
| 2013/0155241 A1 | 6/2013 | Tanuki et al. |
| 2013/0321413 A1* | 12/2013 | Sweeney ................. G06T 15/04 345/420 |
| 2014/0049537 A1* | 2/2014 | Sahoo ................... G06T 19/006 345/419 |
| 2014/0055487 A1 | 2/2014 | Kiyo et al. |
| 2014/0152778 A1 | 6/2014 | Ihlenburg et al. |
| 2014/0278065 A1 | 9/2014 | Ren |

OTHER PUBLICATIONS

S. Abraham and W. Förstner, "Fish-Eye-Stereo Calibration and Epipolar Rectification," ISPRS J. of Photogrammetry & Remote Sensing, vol. 59, No. 5, pp. 278-288, 2005.*

Yi-Fu Chen: A Bird-view Surrounding Monitor System for Parking Assistance, Master thesis—Institute of Computer Science and Information Engineering, National Central University, Chungli. Taiwan, Jun. 27, 2008, pp. 1-73, XP055040951.

Streckel B et al: "Lens Model Selection for a Markerless AR Tracking System", Mixed and Augmented Reality, 2005 Proceedings Fourth IEEE and ACM International Symposium, Vienna, Austria, Oct. 5-8, 2005, Piscataway, NJ, USA, IEEE, Washington DC, USA, Oct. 5, 2005, pp. 130-133, XP010856770, ISBN: 978-0-7695-2459-7.

International Search Report and Written Opinion dated Oct. 10, 2016 from corresponding International Patent Application No. PCT/DE2016/200220.

German Office Action dated Jan. 19, 2016 from corresponding German Patent Application No. 10 2015 210 738.8.

* cited by examiner (Stand der Technik)

METHOD FOR GENERATING A VIRTUAL IMAGE OF VEHICLE SURROUNDINGS

BACKGROUND

The invention relates to a method for generating a virtual image of vehicle surroundings by using a three-dimensional surroundings model, in particular for use in a vehicle which has a camera surround view system.

Vehicles are increasingly being equipped with driver assistance systems which assist the driver with carrying out driving maneuvers. Said driver assistance systems partially include camera surround view systems which make it possible to display the vehicle surroundings to the driver of the vehicle. Such camera surround view systems comprise one or more vehicle cameras which supply real images of the vehicle surroundings, said real images being combined by a data processing unit of the camera surround view system to produce a surroundings image of the vehicle surroundings. The image of the vehicle surroundings is then displayed to the driver on a display unit.

To this end, the real images of the vehicle surroundings obtained by the cameras of the camera surround view system must first be projected onto projection points of a virtual surroundings model of the vehicle surroundings. The virtual image of the vehicle surroundings thus generated, in turn the image displayed on the display unit can subsequently be calculated from the perspective of a virtual camera. The position of the virtual camera for calculating the displayed image can, in this case, be varied so that depending on the requirements and/or the driving situation, a different representation of the vehicle surroundings can be displayed to the driver. The selection of the three-dimensional surroundings model for projecting the real images and for generating the virtual image is, in this case, crucial for the quality of the displayed image.

To this end, the published patent application DE 10 2012 203 523 A1 discloses a generic method for processing image data of respective images which are captured by multiple cameras positioned on a vehicle, said method involving providing a geometry of a three-dimensional environment model having a planar bottom portion located in a ground plane of the vehicle and a surface which has a bottom surface of the planar bottom portion and which delimits an environment space also including the vehicle. The image data of the respective images of the various cameras are projected as environment model image data onto the surface of this three-dimensional environment model. The image data to be signaled of an image to be signaled from the view of a virtual camera on the surface of the three-dimensional environment model is then determined, based on the fulfillment of a given condition in the sense of a mirror-image representation.

Further generic methods are known from the published patent applications DE 10 2012 219 735 A1 and DE 10 2013 220 005 A1.

Conventional camera-based driver assistance systems therefore project texture information of the camera system onto a static projection surface, preferably onto a three-dimensional shell surface as a surroundings model, wherein the radius of curvature increases as the distance from the vehicle increases, as disclosed for example in the previously indicated DE 10 2013 220 005 A1. In this case, the substantial advantage of a three-dimensional shell surface as a surroundings model compared with a two-dimensional base, i.e. a planar projection surface, is that distortions of raised objects in the vehicle surroundings can be reduced.

However, one substantial disadvantage of the previously used three-dimensional shell-like surroundings models or projection surfaces is that these models are, as a rule, described by means of polar equations or by means of polar coordinates, in particular for the projection algorithm, i.e. in order to realize the projection of the real image data. Such a surroundings model based on polar coordinates is shown, by way of example, in FIG. 1, wherein the points of intersection of the grid model shown in FIG. 1 correspond to the projection points of the surroundings model. As can be seen in FIG. 1, the distance of the projection points from one another also increases as the radial distance from the vehicle increases. The substantial disadvantage of this is that the virtual image of the vehicle surroundings and, therefore also the subsequently displayed image, does not have a constant resolution. Rather, the distance of the sampling points, and therefore in principle the sampling point resolution for the image, increases as the distance from the vehicle increases, which adversely affects the subsequently generated image, e.g. in the form of an intensification of distortion artefacts. The "best" or maximum sampling point resolution, i.e. the smallest distance between the sampling points, is also achieved in a region of the virtual image, for which no real image data at all are available, namely in the region below the vehicle. It is known that no image data are displayed for this region, but a three-dimensional model of the vehicle is usually generated and shown in the displayed image.

BRIEF SUMMARY

It is the object of the present invention to indicate an improved method for generating a virtual image of vehicle surroundings, in particular by using an improved three-dimensional surroundings model.

This object is achieved by the subject matter of the independent claims. Further advantageous configurations are set out in the subordinate claims.

The method according to the invention is used to generate a virtual image of the vehicle surroundings. In this case, real images of the vehicle surroundings are recorded within the framework of the method by means of one or more cameras positioned on the vehicle. In addition, individual pixels, i.e. in particular image data such as the color and brightness of individual pixels, from the real images captured by means of the cameras are projected onto projection points in a three-dimensional surroundings model of the vehicle surroundings. In this case, the term "three-dimensional surroundings model" denotes, in particular, a virtual model of the vehicle surroundings, in particular a shell-like projection surface formed from projection points, onto which projection surface the image data are projected in accordance with a predetermined algorithm and/or by means of so-called look-up tables, wherein the projection points are positioned in a distributed manner in at least three spatial directions.

According to the invention, the projection points of the three-dimensional surroundings model are positioned equidistantly in at least one first spatial direction and in at least one second spatial direction. The projection points are, in this case, preferably defined with respect to at least two of three orthogonal spatial directions of the three-dimensional space in which the three-dimensional surroundings model is defined or in which the projection points are positioned in a distributed manner, equidistantly positioned, i.e. preferably with respect to at least one of the coordinate planes of the three-dimensional space. The term "equidistant positioning" denotes such a positioning of the projection points that these are, in at least two spatial directions, i.e. in particular in at least two coordinate directions, the same distances from one another. In this case, the same distance for the projection points from one another can be envisaged for both spatial directions, or different equidistant directions can be selected for the projection points in both spatial directions. A substantial advantage of this positioning of the projection points or of the resulting surroundings model is, in particular in the case of identical distances in both spatial directions, that a constant image resolution with respect to the plane spanned by both spatial directions is achieved for the virtual image. The resolution of the virtual image is therefore, in particular compared with the known surroundings models, independent of the distance of the projection points from the vehicle.

According to a preferred configuration of the method according to the invention, the position of the projection points in the three-dimensional space is defined by means of Cartesian coordinates, i.e. preferably by means of x, y, and z coordinates. As a result, in particular compared to using polar coordinates, an equidistant positioning of the projection points can be easily defined with regard to at least two coordinate directions, for example by means of firmly defined distances between the projection points in the x and y directions.

According to a further preferred configuration of the method according to the invention, the projection points are equidistantly positioned with respect to that coordinate plane which corresponds to an assumed road surface in the surroundings model or which is at least positioned parallel to this. In this case, the road surface denotes the assumed location of the real ground plane of the vehicle in the surroundings model. According to this configuration, the projection points are therefore positioned equidistantly in both spatial directions which span the plane which corresponds to an assumed or the virtual road surface in the surroundings model.

According to a further preferred configuration of the method according to the invention, the size of the distance of the projection points in the first and/or the second spatial direction is defined as a function of at least one modifiable parameter. According to this configuration, the distance of the projection points and, therefore, the resolution of the virtual image can be easily adjusted, for example, to a desired image resolution or also, for example, to the processor performance or the vehicle speed.

According to a further preferred configuration of the method according to the invention, the position of the projection points in a third spatial direction is defined as a function of a distance of the projection points from the vehicle, in particular as a function of the distance horizontally or laterally from an assumed virtual vehicle edge in the surroundings model. The third spatial direction is, in this case, preferably the third of three orthogonal spatial directions and, preferably, the distance of the projection points perpendicular to the assumed road surface. In other words, the position in the third spatial direction is the height of the projection points with respect to the assumed road surface in the virtual surroundings model.

In addition, the position of the projection points in the third spatial direction can, in this case, be defined as a function of a predetermined maximum distance, i.e. as a function of a limit for the distance from the vehicle or from the vehicle edge, and/or as a function of a predetermined slope factor.

In addition, a maximum value can be predetermined for the position of the projection points in the third spatial direction, in particular a maximum height of the projection points in the virtual surroundings model.

The position or the distribution of the projection points in the third spatial direction is, in this case, preferably described by means of an exponential function within the framework of the method according to the invention.

The definition of the position of the projection points in the third spatial direction as a function of one or more of the previously indicated parameters and, in particular, by means of an exponential function thereby makes it possible to provide a dynamic modifiable model that can be adjusted particularly easily to the respective application. For example, the shell-like projection surface thus generated according to the invention can be easily adjusted to the real world, i.e. by adjusting a few parameters. To this end, e.g. distances from objects in the vehicle surroundings can be measured and both the maximum extent (limit for the distance from the vehicle) and the slope factor of the side walls of the projection surface can be adjusted to these object distances, in particular in order to reduce distortions of objects in the displayed image.

According to a further preferred configuration of the method according to the invention, at least one region around the vehicle or around the virtual position thereof in the surroundings model is defined in the surroundings model, in particular a first region, wherein in this region, in particular for calculating the position of the projection points in the third spatial direction, the distance of a projection point from the vehicle corresponds to the lateral distance of the projection point from the vehicle edge, i.e. the distance thereof in the first or second spatial direction. The first region is preferably the regions in front of and behind the vehicle as well as laterally, i.e. to the left and right, adjacent to the vehicle.

According to a further preferred configuration of the method according to the invention, at least one region around the vehicle or around the virtual position thereof in the surroundings model is defined in the surroundings model, in particular a second region, wherein in this region, in particular for calculating the position of the projection points in the third spatial direction, the distance of a projection point from the vehicle edge corresponds to the radial distance of the projection point from a certain point, in particular from a vehicle midpoint or vehicle corner point. The second region is, in this case, preferably the regions at the front left and front right as well as the rear left and rear right adjacent to the vehicle.

In addition, the invention comprises a device for generating a virtual image of vehicle surroundings, comprising one or more cameras which are positioned on the vehicle and which are used for recording real images of the vehicle surroundings. In addition, the device comprises means for generating the virtual image by means of projecting the pixels from the real images captured by means of the cameras onto a defined three-dimensional surroundings model of the vehicle surroundings. According to the invention, the means are in this case configured to generate the virtual image in accordance with the method according to the invention, in particular by using a three-dimensional surroundings model according to one of the configurations described previously.

In addition, the invention relates to a driver assistance system which comprises a device according to the invention or in which the method according to the invention is used.

In addition, the invention comprises a vehicle in which such a driver assistance system or the device according to the invention is positioned.

BRIEF DESCRIPTION OF THE DRAWINGS

The invention will be explained in greater detail below with reference to an embodiment example which sets out further advantages and possible applications, wherein.

DETAILED DESCRIPTION

As is already the case in the known methods from the prior art, real images of the vehicle surroundings are recorded by means of one or more cameras positioned on the vehicle within the framework of the method according to the invention.

In addition, individual pixels of the real images, i.e. in particular image data such as the color and brightness of individual pixels, are projected onto projection points (P) of a three-dimensional surroundings model of the vehicle surroundings within the framework of the method according to the invention. The term "projection points" can, in this case, be understood to be synonymous with the term "sampling points" which is also used in the prior art.

The substantial difference of the present invention from the methods known from the prior art is the configuration of the three-dimensional surroundings model used within the framework of the method according to the invention, in particular the distribution and/or positioning of the projection points ($P_i$) in the three-dimensional space (x,y,z space).

Figure 1:
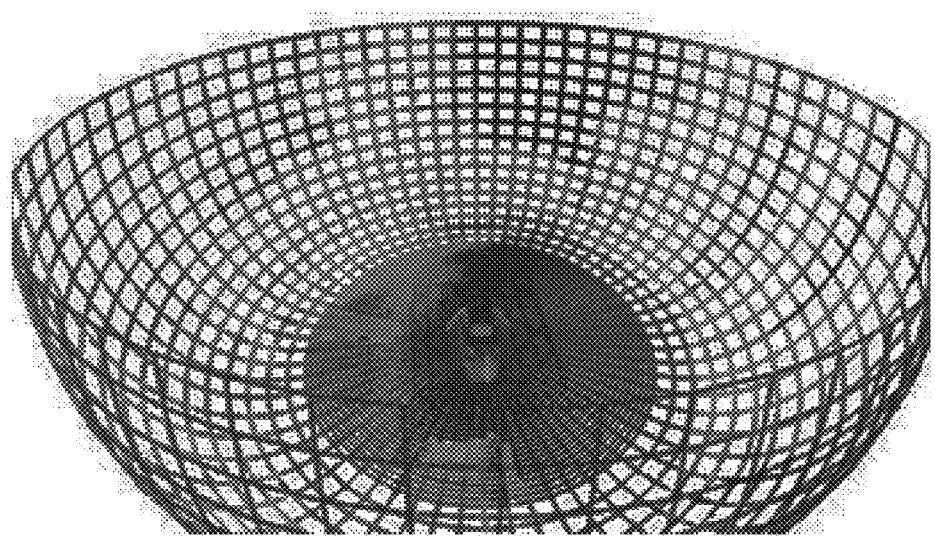
FIG. 1: shows a shell-like surroundings model which is known from the prior art and based on polar coordinates.
Figure 2:
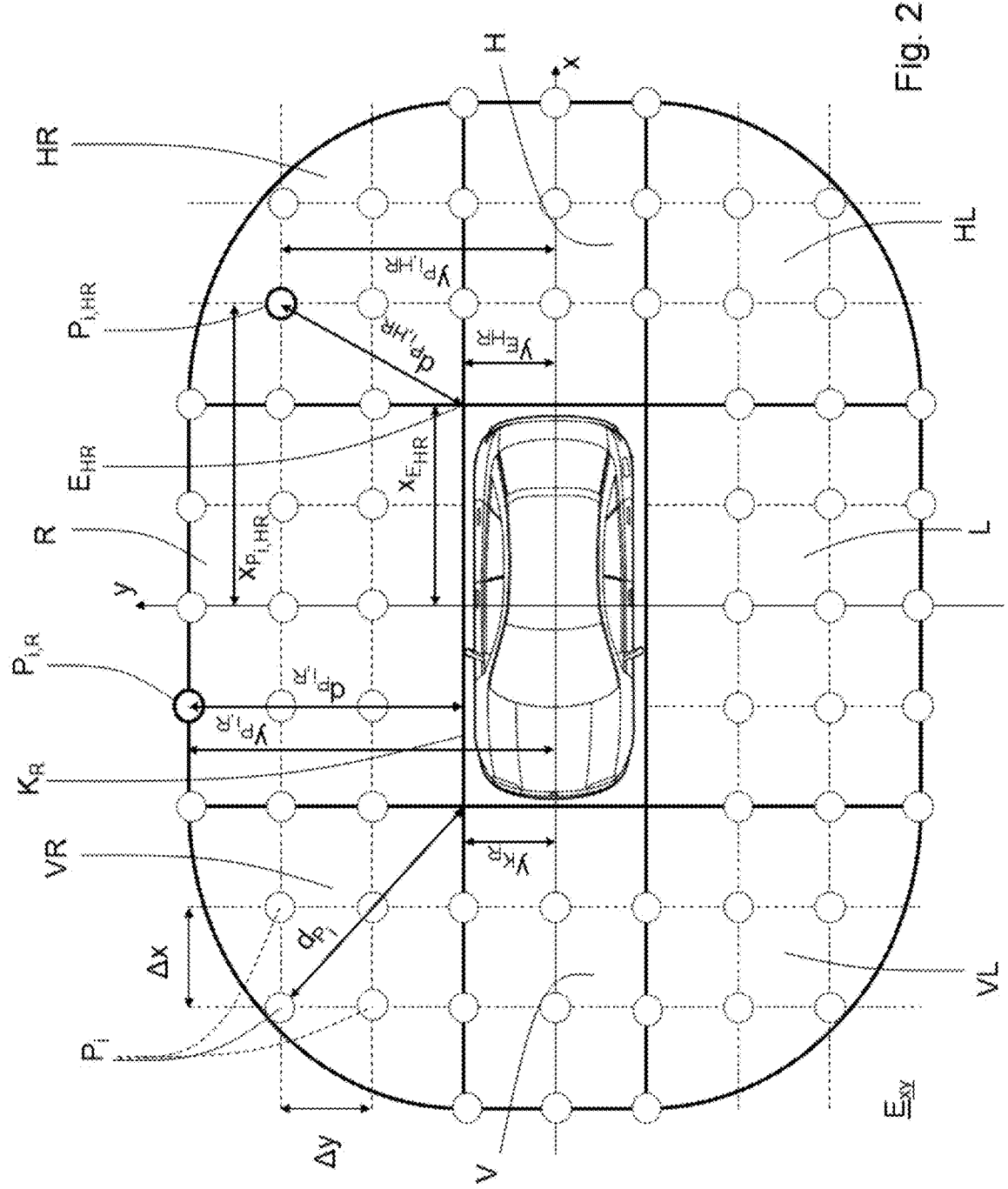
FIG. 2: shows an example of a three-dimensional surroundings model used within the framework of the method according to the invention in a top view.
Figure 3:
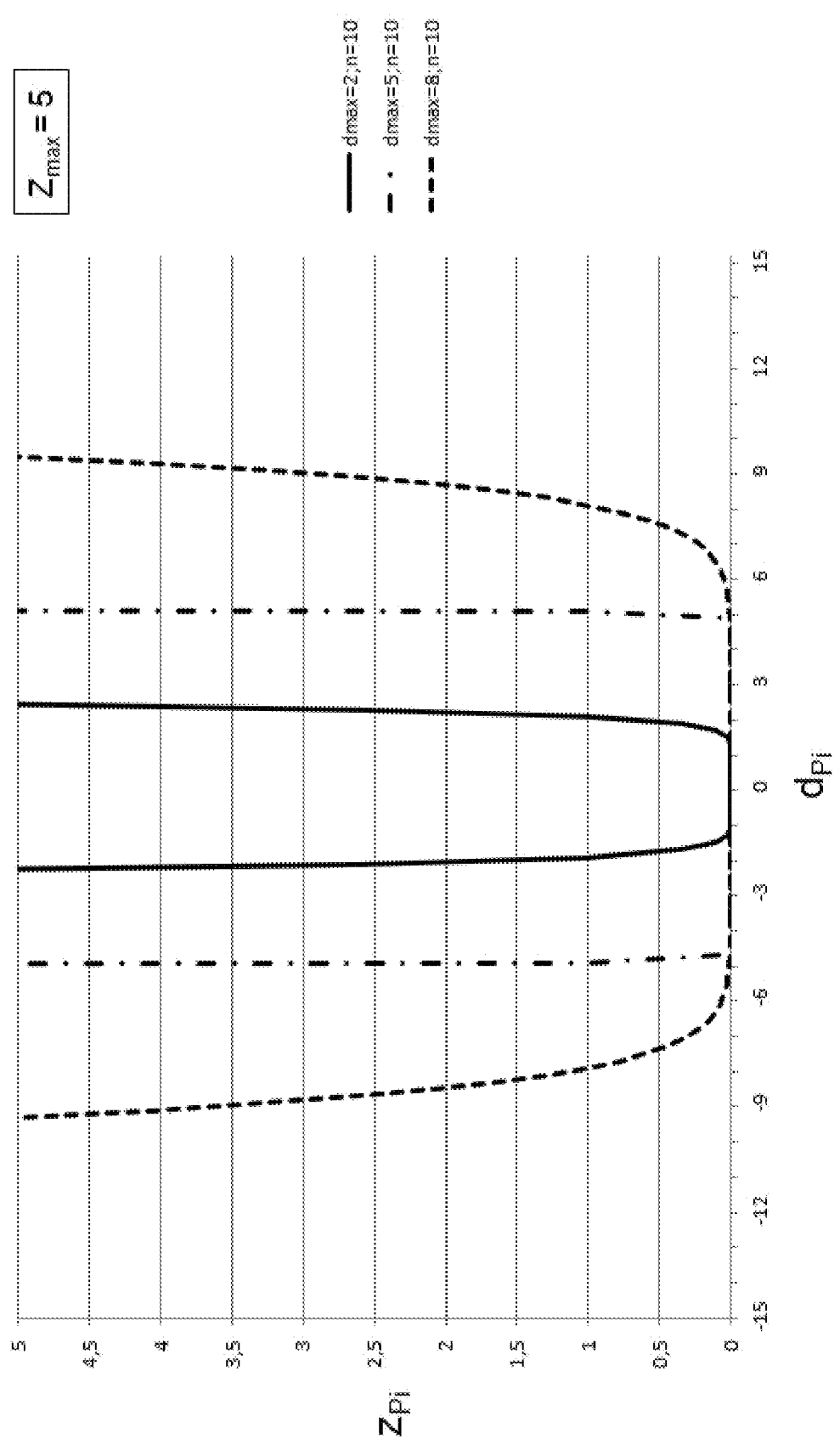
FIG. 3: shows the positioning according to the invention of the projection points in a third spatial direction.

FIGS. 2 and 3 thereby show a preferred configuration of such a surroundings model used within the framework of the method according to the invention.

FIG. 2 shows the surroundings model used in the vertical top view, i.e. from a bird's eye perspective. According to the present invention, the positions of the projection points ($P_i$) of the three-dimensional surroundings model are defined by means of Cartesian coordinates x, y and z. FIG. 2 therefore shows the surroundings model from the vertical z direction onto the x, y coordinate plane ($E_{xy}$), wherein this plane ($E_{xy}$) simultaneously corresponds to the assumed road surface or the ground plane of the vehicle in the surroundings model.

According to the invention, the projection points ($P_i$) are positioned equidistant to one another in at least one first spatial direction (x) and one second spatial direction (y). In this embodiment example, the two spatial directions are the coordinate directions x and y, i.e. the projection points ($P_i$) are constantly the same distances ($\Delta x$, $\Delta y$) from one another in the x and y directions. In the present example, the projection points ($P_i$) are therefore positioned equidistant to one another with respect to that coordinate plane ($E_{xy}$) which corresponds to the assumed road surface in the surroundings model.

According to the invention, the size of the distance ($\Delta x$, $\Delta y$) of the projection points from one another in the x and y directions can, in this case, either be firmly predetermined or variably defined, in particular as a function of one or more parameters, for example as a function of the desired resolution of the virtual or displayed image, as a function of the processor performance of the image processing unit and/or, for example, as a function of the current speed.

The position of the projection points ($P_i$) in the third spatial direction (z), which corresponds in this embodiment example to the z direction and therefore the height of the projection points ($P_i$) above the assumed road surface, increases in the present embodiment example as the distance ($d_{Pi}$) from the vehicle increases so that the surroundings model, as shown in FIG. 3, forms a shell-like projection surface. According to the invention, the position in the z direction is, in this case, defined as a function of the distance ($d_{Pi}$) of the projection points ($P_i$) from the vehicle and as a function of other parameters.

In connection with this, FIG. 3 shows a preferred configuration for specifying the position of the projection points ($z_{Pi}$) in the z direction. The position ($z_{Pi}$) in the z direction is, in this case, defined both as a function of the distance ($d_{Pi}$) from the vehicle and as a function of a limit for the distance from the vehicle, i.e. a predetermined maximum distance ($d_{max}$) of the projection points ($P_i$) from the vehicle, and as a function of a predetermined slope parameter (n). In addition, a maximum value or a limit ($z_{max}$) is specified for the height of the surroundings model in the example shown.

The z coordinates or the height ($z_{Pi}$) of the projection points is/are therefore generally the product of the following formula $$z_{Pi} = (d_{Pi}/d_{max})^n \tag{1}$$

In this case, the values $d_{max}$, $z_{max}$ and n are preferably selected so that they are identical for all of the projection points ($P_i$), whereas the distance ($d_{Pi}$) of the projection points ($P_i$) is preferably defined differently for individual regions around the vehicle.

To this end, first regions are specified in accordance with FIG. 2 in the present example, namely the regions in front of (V) and behind (H) the vehicle, as well as the regions on the left (L) and right (R) adjacent to the vehicle, wherein in these regions the distance ($d_{Pi}$) of a projection point ($P_{i,R}$) from the vehicle corresponds to the lateral or the vertical distance ($d_{Pi,R}$) of the projection point from the nearest virtual vehicle edge ($K_R$) in the x or y direction. Accordingly, a distance ($d_{Pi}$) of the projection points ($P_i$) according to the following formula applies in these regions for calculating the height or the z coordinate ($z_{Pi}$) (indicated by way of example here for any projection point ($P_{i,R}$) in the region (R) on the right adjacent to the vehicle)

$$d_{Pi,R} = y_{Pi,R} - y_{KR} \tag{2}$$

In addition, second areas, namely the area at the front left (VL) and front right (VR) adjacent to the vehicle as well as the areas at the rear left (HL) and rear right (HR) adjacent to the vehicle, which can in particular correspond to the overlapping regions of cameras of a camera surround view system, i.e. their overlapping recording areas, are specified in the present example. In these regions, the distance ($d_{Pi}$) of a projection point ($P_{i,HR}$) from the vehicle corresponds to the radial distance ($d_{Pi,HR}$) of the projection point ($P_{i,HR}$) from the nearest vehicle corner point ($E_{HR}$), i.e. from the nodal point of the nearest vehicle edges. Accordingly, a distance ($d_{Pi}$) of the projection points ($P_i$) according to the following formula applies in these regions for calculating the height ($z_{Pi}$) (indicated by way of example here for any projection point ($P_{i,HR}$) in the region (HR) at the rear right adjacent to the vehicle)

$$d_{Pi,HR} = \sqrt{((x_{Pi,HR} - x_{EHR})^2 + (y_{Pi,HR} - y_{EHR})^2)} \tag{3}$$

The three-dimensional surroundings model which is used within the framework of the present invention in order to generate the virtual image of the vehicle surroundings is shown in a very simplified manner in FIGS. 2 and 3, in particular with only a few projection points ($P_i$) compared to the real application. The surroundings model can, for example, either be statically predetermined when used for a driver assistance system in a vehicle or, for example, can be recalculated for each image in real time. The method according to the invention can thereby be implemented in particular by a computer program in a driver assistance system which contains computer commands which can be executed by a microprocessor. This program is stored in one possible embodiment on a data storage device or in a program memory.

The invention claimed is:

1. A method for generating a virtual image of vehicle surroundings, said method comprising:
   recording real images of the vehicle surroundings utilizing one or more cameras positioned on the vehicle; and
   projecting individual pixels from the real images captured by the one or more cameras onto projection points ($P_i$) in a three-dimensional surroundings model of the vehicle surroundings,
   wherein
   the projection points ($P_i$) are positioned equidistant to one another in a first spatial direction (x) and a second spatial direction (y) which is orthogonal to the first spatial direction, and
   the position ($z_{Pi}$) of the projection points ($P_i$) in a third spatial direction (z) is defined as a function of a distance ($d_{Pi}$) from the vehicle in the surroundings model.

2. The method according to claim 1, wherein the position of the projection points (Pt) in the three-dimensional space is defined by Cartesian coordinates.

3. The method according to claim 2, wherein the projection points ($P_i$) are positioned equidistant to one another with respect to a coordinate plane ($E_{xy}$), which corresponds to a road surface in the surroundings model.

4. The method according to claim 3, wherein the size of the equidistant distances ($\Delta x$; $\Delta y$) of the projection points ($P_i$) in the first and/or in the second spatial direction (x, y) is defined as a function of at least one modifiable parameter.

5. The method according to claim 1, wherein the position ($z_{Pi}$) of the projection points ($P_i$) in the third spatial direction (z) is also defined as a function of a predetermined limit ($d_{max}$) for the distance ($d_{pi}$) from the vehicle and/or as a function of a predetermined slope parameter (n).

6. The method according to claim 5, wherein a maximum value ($z_{max}$) for the position ($z_{Pi}$) of the projection points ($P_i$) in the third spatial direction (z) is also predetermined for calculating the surroundings model.

7. The method according to claim 6, wherein at least one first region (V, H, L, R) about the vehicle is defined in the surroundings model, wherein in this region the distance ($d_{Pi}$) of the projection points ($P_i$) from the vehicle corresponds to the lateral distance ($d_{Pi,R}$) of the projection points ($P_{i,R}$) in this region from a vehicle edge ($K_R$).

8. The method according to claim 7, wherein at least one second region (VL, VR, HL, HR) about the vehicle is defined in the surroundings model, wherein in this region the distance ($d_{Pi}$) of the projection points ($P_i$) from the vehicle corresponds to the radial distance ($d_{Pi,HR}$) of the projection points ($d_{Pi,HR}$) in this region from a vehicle corner point ($E_{HR}$).

9. A device for generating a virtual image of vehicle surroundings, comprising:
   one or more cameras positioned on the vehicle for recording real images of the vehicle surroundings; and
   a processor configured to generate the virtual image by projecting pixels from the real images captured by the one or more cameras onto projection points (Pi) in a three-dimensional surroundings model of the vehicle surroundings, wherein
   the processor is further configured to project individual pixels from the real images captured by the one or more cameras onto projection points ($P_i$) in a three-dimensional surroundings model of the vehicle surroundings such that the projection points ($P_i$) are positioned equidistant to one another in at least one first spatial direction (x) and one second spatial direction (y) which is orthogonal to the first spatial direction, and
   the position ($z_{Pi}$) of the projection points ($P_i$) in a third spatial direction (z) is defined as a function of a distance ($d_{Pi}$) from the vehicle in the surroundings model.

* * * * *